(12) United States Patent
Yoo et al.

(10) Patent No.: US 8,467,003 B2
(45) Date of Patent: Jun. 18, 2013

(54) NOISE REDUCTION METHOD, MEDIUM, AND SYSTEM

(75) Inventors: Young-jin Yoo, Guri-si (KR); Seong-deok Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1530 days.

(21) Appl. No.: 11/806,838

(22) Filed: Jun. 4, 2007

(65) Prior Publication Data
US 2007/0296871 A1    Dec. 27, 2007

(30) Foreign Application Priority Data
Jun. 22, 2006    (KR) .................. 10-2006-0056519

(51) Int. Cl.
*H04N 5/14* (2006.01)

(52) U.S. Cl.
USPC ..................... 348/701; 348/E5.062

(58) Field of Classification Search
USPC ............................. 348/701, E5.62
See application file for complete search history.

(56) References Cited

U.S. PATENT DOCUMENTS

| | | | | |
|---|---|---|---|---|
| 6,078,686 A * | 6/2000 | Kim | | 382/167 |
| 6,091,862 A * | 7/2000 | Okisu | | 382/300 |
| 6,175,657 B1 * | 1/2001 | Mancuso et al. | | 382/261 |
| 6,633,683 B1 * | 10/2003 | Dinh et al. | | 382/260 |
| 6,681,054 B1 * | 1/2004 | Gindele | | 382/272 |
| 6,970,268 B1 * | 11/2005 | Shin et al. | | 358/1.9 |
| 7,110,612 B1 * | 9/2006 | Wang | | 382/262 |
| 7,346,226 B2 * | 3/2008 | Shyshkin | | 382/275 |
| 7,729,555 B2 * | 6/2010 | Chen et al. | | 382/261 |
| 2006/0133689 A1 * | 6/2006 | Andersson et al. | | 382/261 |
| 2007/0132865 A1 * | 6/2007 | Adams et al. | | 348/242 |

FOREIGN PATENT DOCUMENTS

| | | |
|---|---|---|
| JP | 11-215515 | 8/1999 |
| JP | 2003-110860 | 4/2003 |
| KR | 1999-002914 | 1/1999 |
| KR | 10-2004-0036458 | 4/2004 |
| KR | 10-2004-0092131 A | 11/2004 |
| KR | 10-2006-0019897 | 3/2006 |

OTHER PUBLICATIONS

A Universal Noise Removal Algorithm with an Impulse Detector Garnett et al, IEEE Transactions on Image Processing, vol. 14, No. 11, Nov. 2005, p. 1747-1753.*
English Abstract of Korean Patent Application No. 10-1997-0026662.
Roman Garntt et al.,("A Universal Noise Removal Algorithm with an Impulse Detector", IEEE Transactions on Image Processing, vol. 14, No. 11, Nov. 2005) pp. 1747-1754.
Tinku Acharya and Ajoy K. Ray ("Image Processing," Wiley Interscience, 2005) pp. 217-218.

* cited by examiner

*Primary Examiner* — Mehrdad Dastouri
*Assistant Examiner* — Mohammed Rahaman
(74) *Attorney, Agent, or Firm* — Staas & Halsey LLP

(57) ABSTRACT

A noise reduction method, medium, and system. The noise reduction method includes calculating a noise level of an input image and removing noise from a central pixel within a window of a predetermined size in the input image using a weight determined based on a difference between signal intensities of the central pixel and a plurality of adjacent pixels within the window and the calculated noise level.

33 Claims, 14 Drawing Sheets

NOISE REDUCTION METHOD, MEDIUM, AND SYSTEM

CROSS-REFERENCE TO RELATED APPLICATIONS

This application claims priority from Korean Patent Application No. 10-2006-0056519 filed on Jun. 22, 2006 in the Korean Intellectual Property Office, the disclosure of which is incorporated herein by reference in its entirety.

BACKGROUND OF THE INVENTION

1. Field of the Invention

One or more embodiments of the present invention relate to noise in an image, and more particularly, to a method, medium, and system detecting and/or reducing noise in an input image.

2. Description of the Related Art

Recently, digital photographing apparatuses, such as digital still cameras and digital camcorders, have been widely used. However, images photographed by these digital photographing apparatuses contain noise that deteriorates image quality. Therefore, it is desirable that the noise in the images be reduced in order to obtain high-quality images.

Noise in images is typically caused by physical instability and system characteristics of image sensors included in digital photographing devices. Noise produced by complementary metal oxide semiconductors (CMOSes), which are widely used in digital photographing devices, typically includes fixed-pattern noise and temporal noise (or time-varying noise). The fixed-pattern noise can be removed relatively easily, and a number of relevant technologies for the same have already been implemented. However, it is not as easy to remove the temporal noise. In addition, outlier or impulse noise is a severe contributor to the deterioration of image quality and cannot be easily removed. Hence, a technology for detecting and removing noise (in particular, the temporal noise and the impulse noise) from an image is desired.

SUMMARY OF THE INVENTION

It is an aspect of one or more embodiments of the present invention to remove noise from an input image.

Additional aspects and/or advantages of the invention will be set forth in part in the description which follows and, in part, will be apparent from the description, or may be learned by practice of the invention.

To achieve the above and/or other aspects and advantages, embodiments of the present invention include a noise reduction method, including calculating a noise level of an input image, and controlling a removing of noise from a central pixel within a window of a predetermined size in the input image using a weight determined based on a difference between signal intensities of the central pixel and a plurality of adjacent pixels within the window and the calculated noise level.

To achieve the above and/or other aspects and advantages, embodiments of the present invention include a system with noise reduction, including a noise level calculation unit to calculate a noise level of an input image, and a filtering unit to control a removing of noise from a central pixel within a window of a predetermined size in the input image using a weight determined based on a difference between signal intensities of the central pixel and plurality of adjacent pixels within the window and the calculated noise level.

To achieve the above and/or other aspects and advantages, embodiments of the present invention include a photographing system, including a photographing unit to photograph a subject as an input image, and a noise reduction unit to calculate a noise level of the input image and control a removal of noise from a central pixel within a window of a predetermined size in the input image using a weight determined based on a difference between signal intensities of the central pixel and a plurality of adjacent pixels within the window and the calculated noise level.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
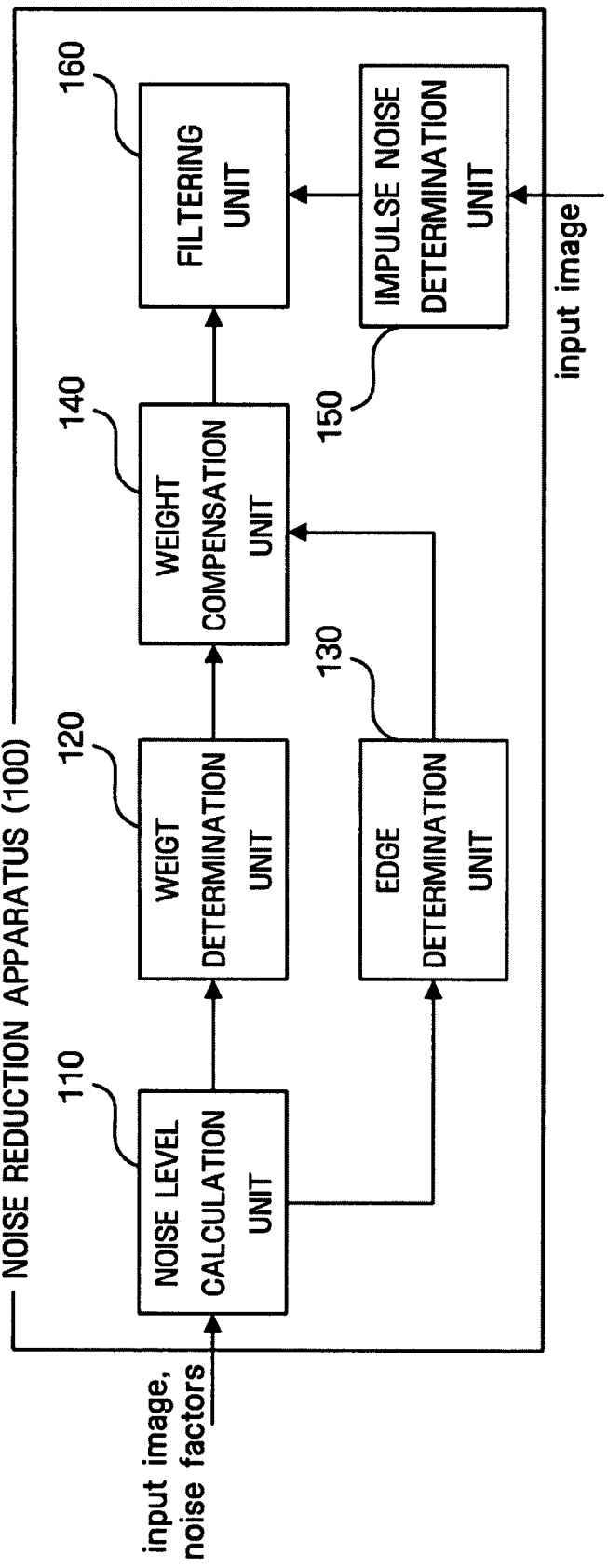
FIG. 1 illustrates a noise reduction system, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a noise reduction system 100, according to an embodiment of the present invention. Referring to FIG. 1, the noise reduction system 100 includes a noise level calculation unit 110, a weight determination unit 120, an edge determination unit 130, a weight compensation unit 140, and a filtering unit 160. The noise reduction system 100 may also be a photographing system such as a digital still camera or a digital camcorder.

In an embodiment, the case where the input image is processed in a red, green and blue (RGB) Bayer domain will primarily be used to describe embodiments of the present invention. However, embodiments of the present invention are not restricted to such an embodiment. For example, noise reduction may similarly be implemented when the input image is processed in a YUV or YCrCb domain and should be construed as being within the scope of the present invention, again noting that alternative embodiments are equally available.

The noise level calculation unit 110 may calculate a noise level of an input image. The noise level can be a numerical representation of the amount of noise that exists in the input image. Factors (hereinafter referred to as 'noise factors') which mainly affect the noise level include the signal intensity of an input image, an auto gain control (AGC) value of the input image according to automatic exposure (AE) of the input image when photographed, and the illuminance of the input image. The signal intensity is a measure of the amount of light collected when the input image is photographed.

The noise level of the input image, according to such noise factors, may be set in advance through an experiment with a photographing system applying the noise reduction, according to an embodiment of the invention. Then, after such an advance setting, the noise level of the input image may be calculated, such as by the noise level calculation unit 110, an embodiment of which will now be described with reference to FIG. 2A through FIG. 3.

Figure 2A:
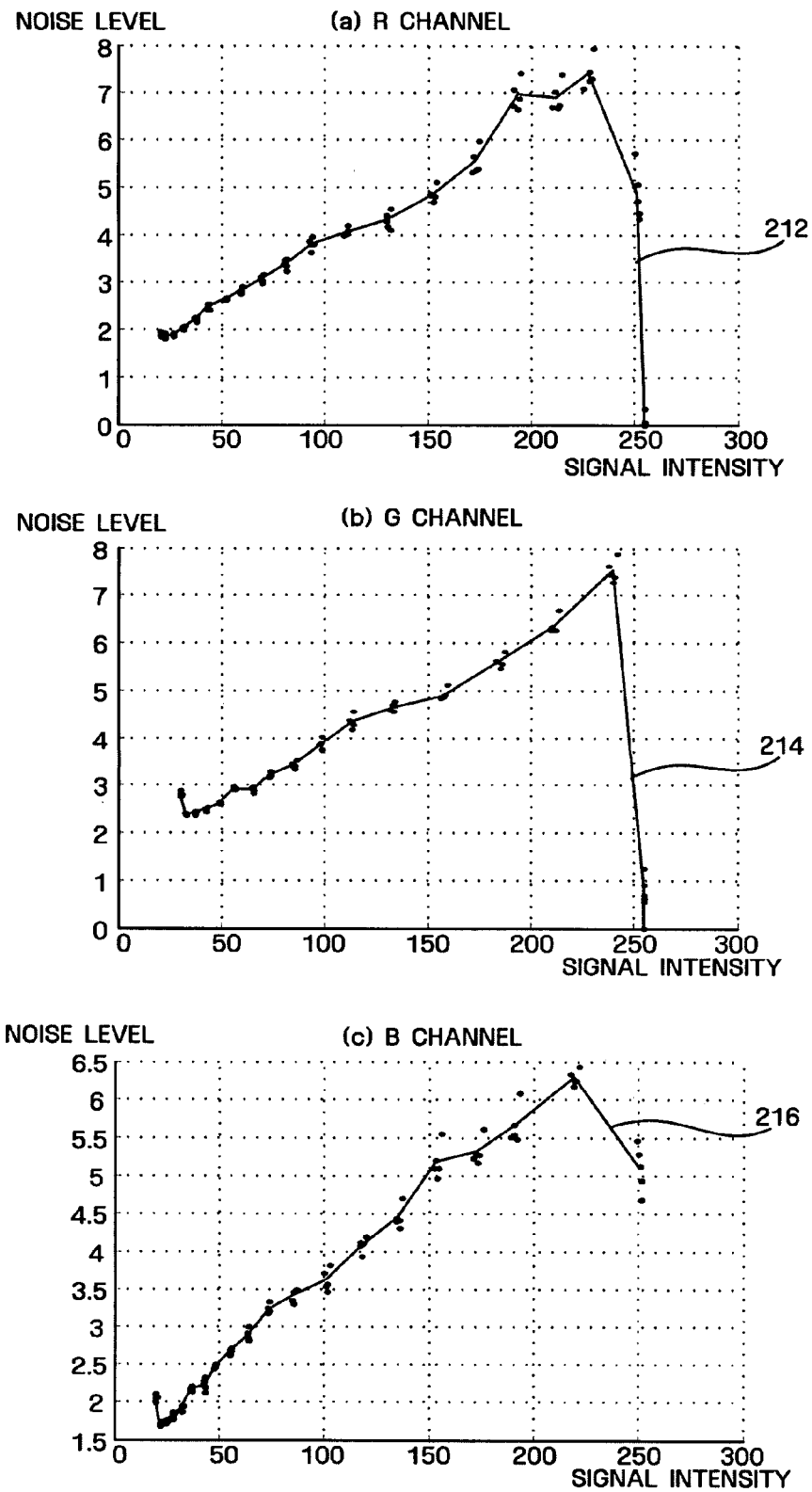
FIG. 2A illustrates experimental results of a relationship between signal intensity and noise levels of an input image, according to an embodiment of the present invention.

FIG. 2A, in illustrations (a)-(c), illustrates experimental results of a relationship between signal intensity and noise levels of an input image, according to an embodiment of the present invention. Referring to FIG. 2A, as shown in the illustrations (a)-(c), the noise level of the input signal according to the signal intensity thereof may be measured for each of the respective R, G and B channels for a photographing system implementing noise reduction, according to an embodiment of the present invention, resulting in the obtained trend lines 212, 214 and 216. A lookup table indicating the relationship between the signal intensity and noise level of the input image may thus be generated using the trend lines 212, 214 and 216. In addition, the noise level calculation unit 110 may calculate the noise level of the input image according to the signal intensity thereof using such a lookup table. Here, though a lookup table has been mentioned as one way of storing such information, alternative embodiments are equally available for providing and/or storing such information.

Figure 2B:
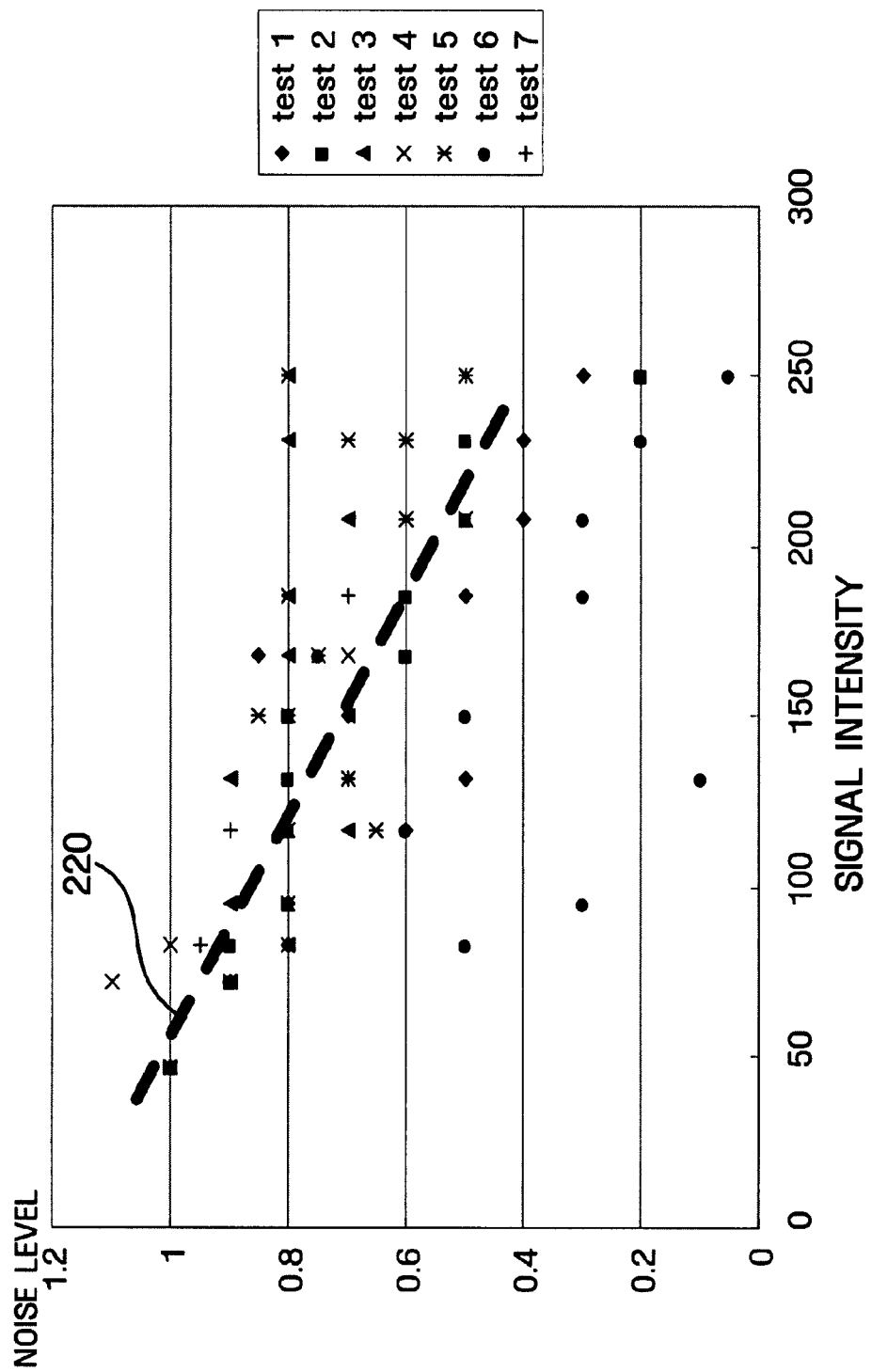
FIG. 2B illustrates experimental results of a relationship between signal intensity and noise levels of an input image as perceived.

It has been found that the human perception of noise is actually lower when observing an image with high signal intensity than when observing an image with low signal intensity. Such human visual characteristics may thus be reflected in the process of calculating the noise level, according to an embodiment of the present invention. To this end, a number of human subjects may be asked to visually compare input images having various signal intensities with an original image and determine the noise levels of the input images. Then, a trend line 220 for the noise levels determined by these subjects, based on the signal intensities of the input images, may be obtained as illustrated in FIG. 2B. This experiment may also be conducted for each of the R, G and B channels to obtain respective trend lines for the R, G and B channels.

Figure 2C:
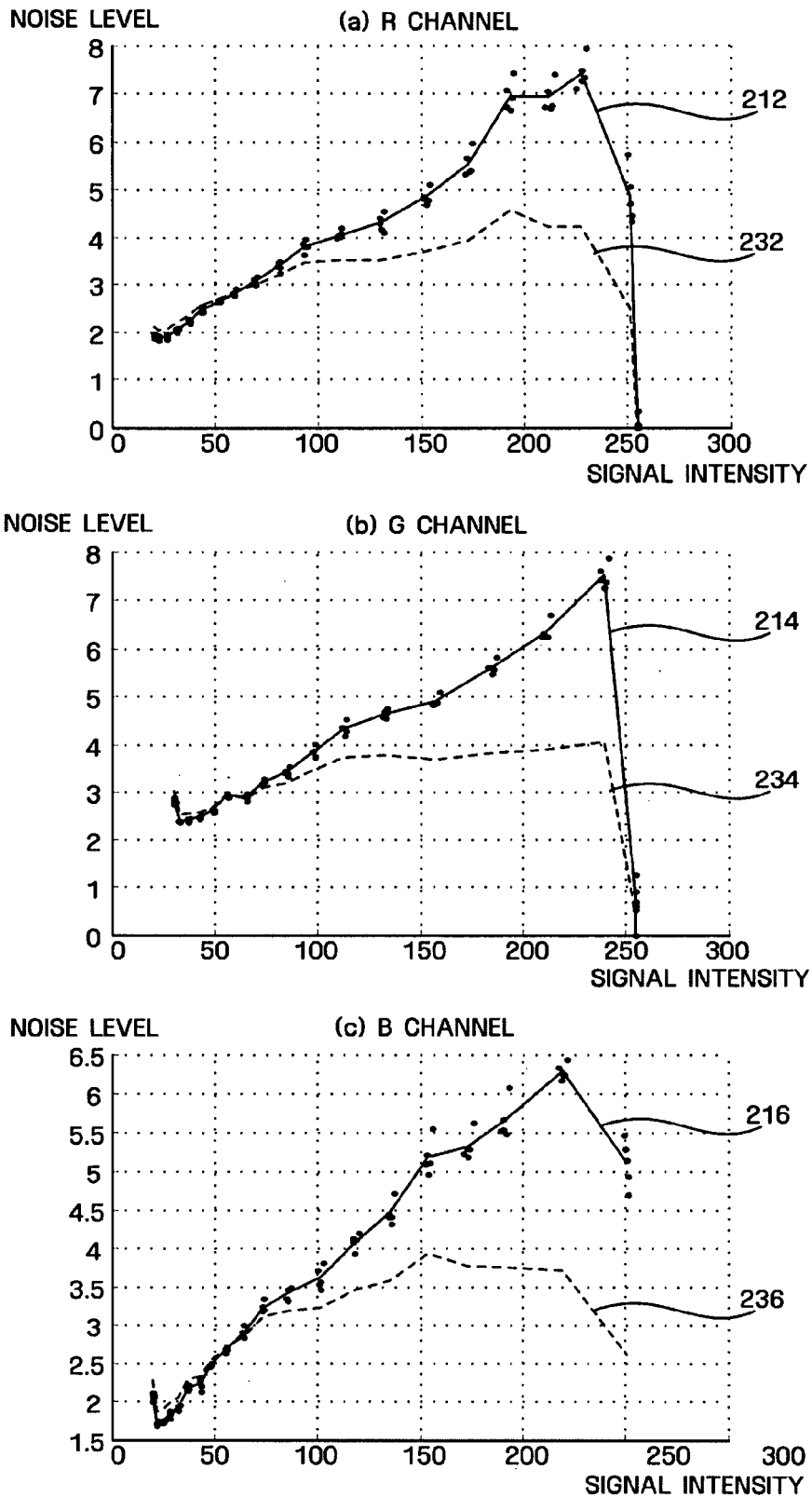
FIG. 2C illustrates a result of a reflecting of the experimental results of FIG. 2B with the experimental results of FIG. 2A.

FIG. 2C, in illustrations (a)-(c), illustrates results of reflecting the respective trend lines for the R, G and B channels in the trend lines 212, 214 and 216 of FIG. 2A, according to an embodiment of the present invention. The shown noise level functions 232, 234, and 236, according to signal intensity, which may be finally obtained, indicate the results of multiplying the trend lines 212, 214 and 216 of FIG. 2A by the respective trend lines for the R, G, and B channels obtained similar to that shown in FIG. 2B. The noise level calculation unit 110 may thus calculate the noise level of the input image according to the signal intensity thereof for each of the R, G and B channels using the final noise level functions 232, 234 and 236, according to an embodiment of the present invention.

Figure 3:
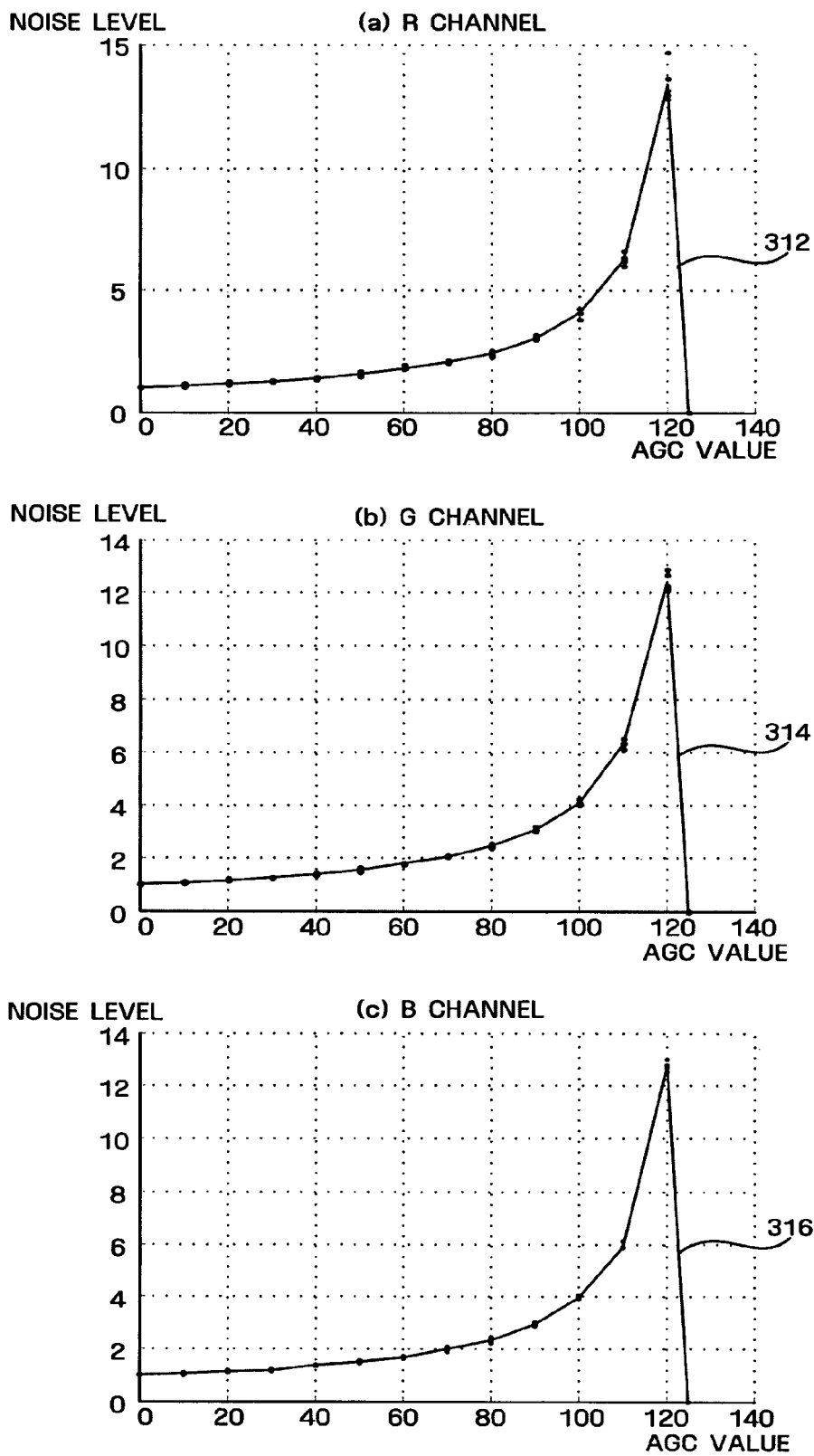
FIG. 3 illustrates experimental results of a relationship between an auto gain control (AGC) value and noise levels of an input image, according to an embodiment of the present invention.

FIG. 3, in illustrations (a)-(c), illustrates experimental results of a relationship between an AGC value and noise levels of an input image, according to an embodiment of the present invention. Referring to FIG. 3, as shown in the illustrations (a)-(c), the noise level of the input signal according to the AGC value thereof may be measured for each of the respective R, G and B channels for a photographing system implementing noise reduction, resulting in the respective obtained trend lines 312, 314 and 316. A lookup table indicating the relationship between the AGC value and noise level of the input image may thus be generated using the trend lines 312, 314 and 316. In addition, the noise level calculation unit 110 may calculate the noise level of the input image according to the AGC value thereof using such a lookup table. Here, again, though a lookup table has been mentioned as one way of storing such information, alternative embodiments are equally available for providing and/or storing such information.

Illuminance is one of the major noise factors affecting impulse noise. Generally, the lower the illuminance of an image, the higher the probability that impulse noise is generated. Therefore, if the illuminance of the input image is less than a predetermined value, an additional operation may be performed to remove the impulse noise from the input image, which will be described in greater detail below in relation to the impulse noise determination unit 150.

Referring to FIG. 1, the weight determination unit 120 may calculate a weight to be assigned to each adjacent pixel within a window of a predetermined size in the input image, based on the noise level of the input image and the difference between signal intensities of a central pixel and each adjacent pixel within the window, for example. The central pixel may be the target pixel for noise reduction, and located at the center of the window. The adjacent pixels may be pixels in the window to which the same type of optical channel as the central pixel is applied. For example, if the central pixel is a pixel of an R channel, the adjacent pixels may be the remaining pixels of the R channel within the window.

The filtering unit 160, which will be described in greater detail below, refers to using information regarding each adjacent pixel to remove noise from the central pixel. A weight assigned to each adjacent pixel is a measure of to what degree the information regarding each adjacent pixel will be reflected in determining the final signal intensity of the central pixel from which noise was removed.

Figure 4:
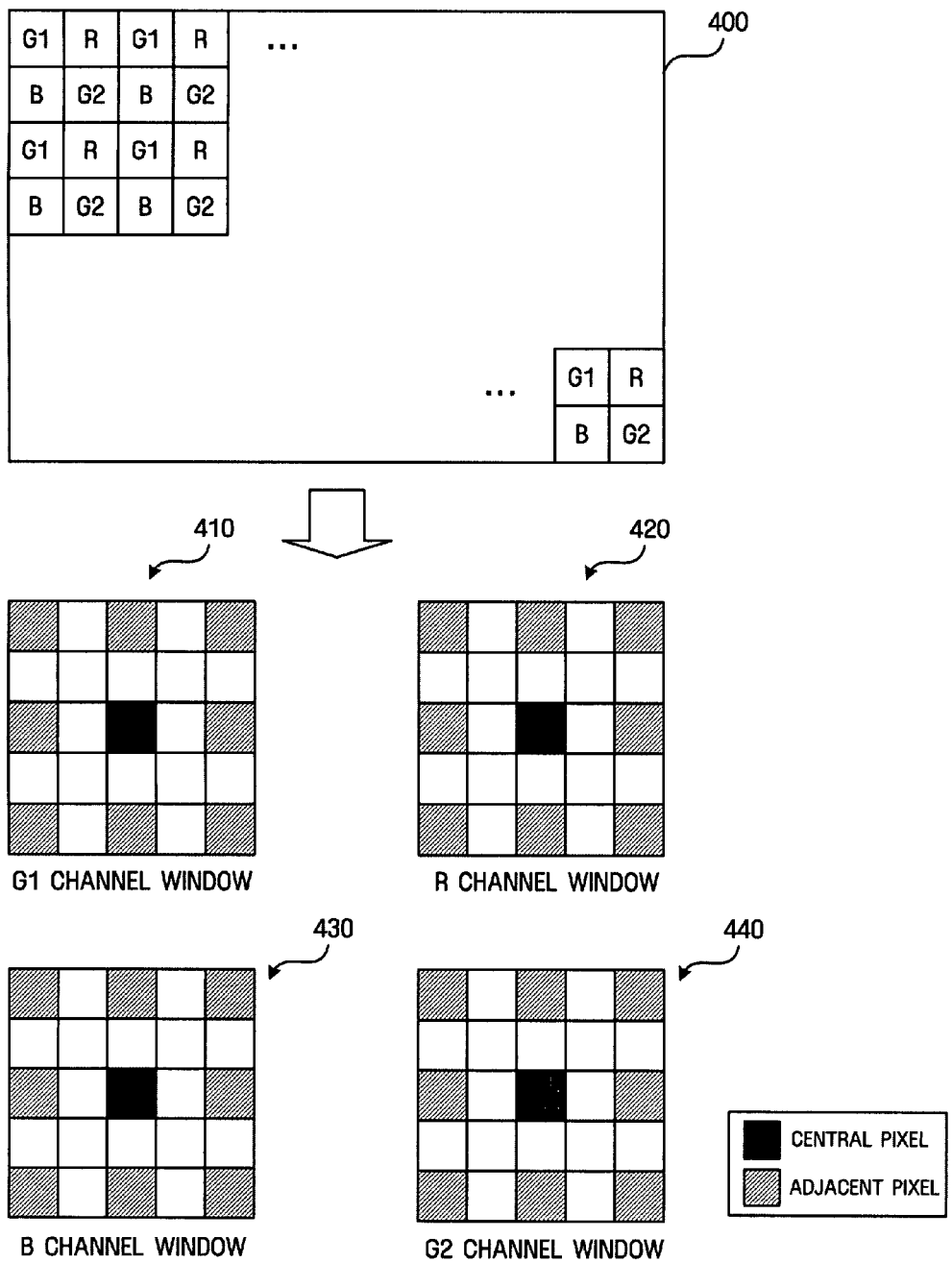
FIG. 4 illustrates a window according to an embodiment of the present invention.

The size of the window may vary according to differing embodiments. FIG. 4 illustrates a window according to an embodiment of the present invention. Specifically, FIG. 4 illustrates an input image 400 in an RGB Bayer pattern and four windows 410 through 440 for G1, R, B and G2 optical channels, respectively, in the input image 400. Referring to FIG. 4, if the pixel size of the window is set to be 5×5, then there are 8 adjacent same channel pixels around the central pixel.

A weight that the weight determination unit 120 assigns to each adjacent pixel can be a real number between 0 and 1. In one embodiment, the weight may be determined using a fuzzy membership function whose resultant values have a Gaussian distribution according to the difference between the signal intensities of the central pixel and each adjacent pixel. Such a fuzzy membership function, according to an embodiment of the present invention, may be defined by the below Equation 1, for example.

$$k(I_p - I_x) = \exp\left\{-\frac{1}{2}\left(\frac{I_p - I_x}{c \cdot n}\right)^2\right\}$$ Equation 1

Here, $I_p$ indicates the signal intensity of a central pixel, $I_x$ indicates the signal intensity of an adjacent pixel, c indicates a noise level of an input image calculated according to an AGC value thereof, n indicates a noise level of the input image calculated according to the signal intensity thereof. The noise levels c and n can be obtained from the noise level calculation unit 110, for example. The noise level n may be calculated using the results of mechanical measurements, for example, as described above with reference to FIG. 2A. Alternatively, it may be preferable to calculate the noise level n using experimental results that reflect human visual characteristics as described above with reference to FIGS. 2B and 2C. In addition, while both of the noise levels c and n have been used in the above Equation 1 to obtain a weight, any one of the noise levels c and n may be used, depending on embodiment.

Referring to FIG. 1, the edge determination unit 130 may determine the edge type of an edge of a central pixel in a window. As an example, edges may be classified into a horizontal edge, a vertical edge, an upper right-to-lower left edge, an upper left-to-lower right edge, and a non-directional edge according to edge directions. Hereinafter, a method of determining edge types of edges according to an embodiment will be described with reference to FIGS. 5 and 6. Since various technologies for determining edge types have been used, the present invention is not restricted to the following description. Any technology for determining edge types may be also be applied to embodiments of the present invention.

Figure 5:
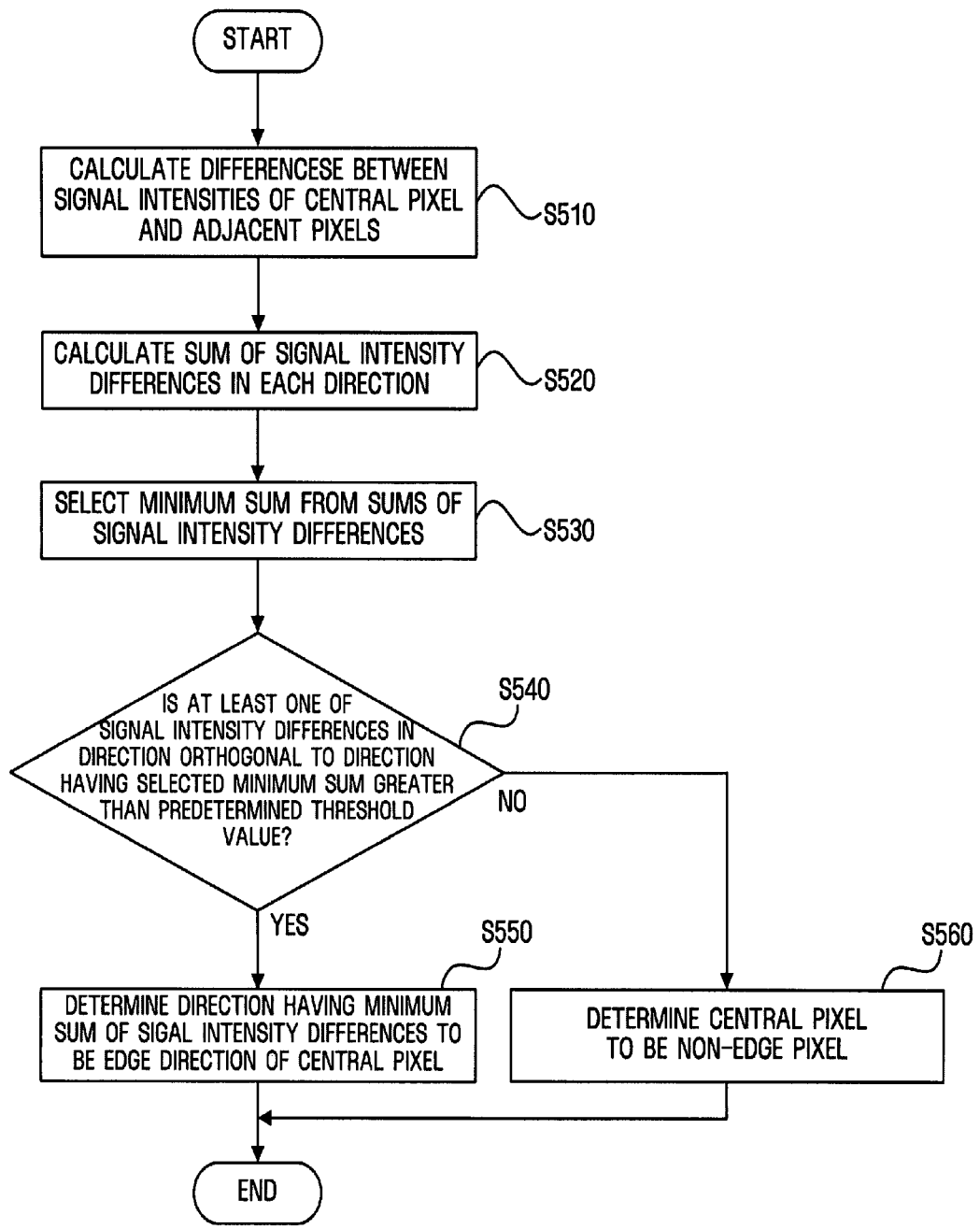
FIG. 5 illustrates a method for determining an edge type of an edge, according to an embodiment of the present invention.
Figure 6:
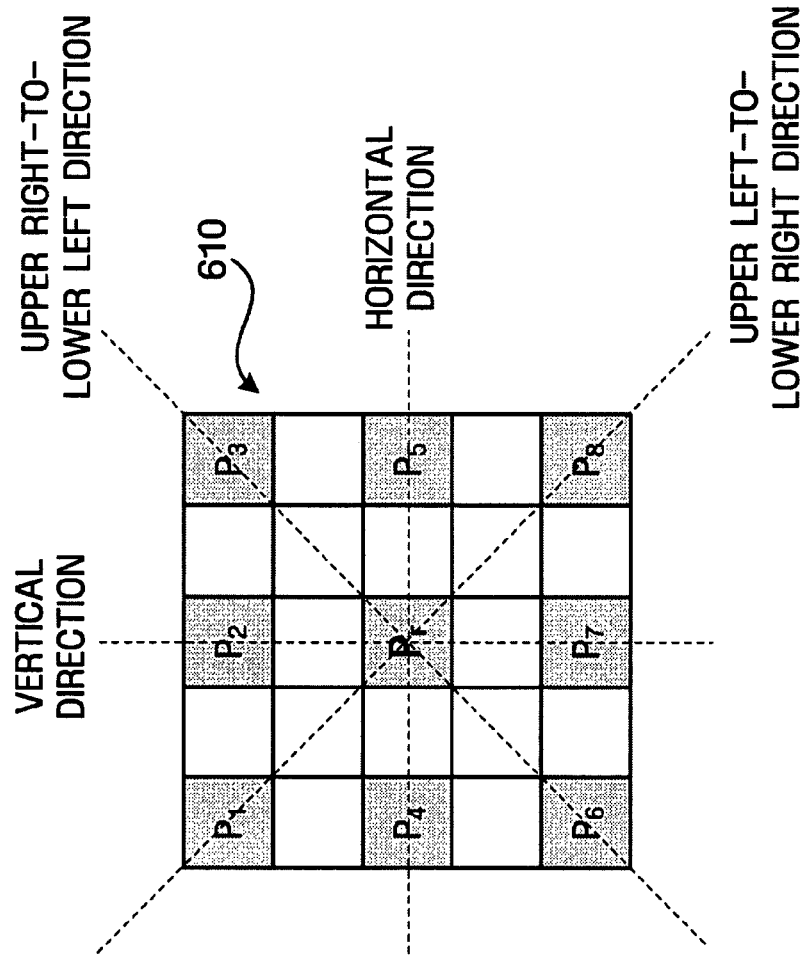
FIG. 6 illustrates a window used to determine an edge type of an edge.

FIG. 5 illustrates a method of determining the edge type of an edge, according to an embodiment of the present invention. When an input image has an RGB Bayer pattern and a 5×5 window 610, illustrated in FIG. 6, is used, the edge determination unit 130 may calculate a difference between the signal intensity of a central pixel $P_r$ and that of each of adjacent pixels $P_1$ through $P_8$, in operation S510. Since the number of adjacent pixels here is eight, eight signal intensity differences may be given by the below Equation 2, for example.

$$D_{HOR\_1}=|I_4-I_r|, D_{HOR\_2}=|I_r-I_5|$$

$$D_{VER\_1}=|I_2-I_r|, D_{VER\_2}=|I_r-I_7|$$

$$D_{NE\_1}=|I_3-I_r|, D_{NE\_2}=|I_r-I_6|$$

$$D_{NW\_1}=|I_1-I_r|, D_{NW\_2}=|I_r-I_8|$$ Equation 2

Here, $I_1$ through $I_8$ indicate the signal intensities of the adjacent pixels $P_1$ through $P_8$, respectively, and $I_r$ indicates the signal intensity of the central pixel $P_r$. In the window 610, the adjacent pixels $P_1$ through $P_8$ are shown to exist in four directions, for example, that is, a horizontal direction, a vertical direction, an upper right-to-lower left direction, and an upper left-to-lower right direction from the central pixel $P_r$. If the central pixel $P_r$ is an edge pixel, any one of the four directions may be an edge direction.

In an embodiment, if the size of a window used to calculate a weight and the size of a window used to determine the type of an edge are identical, for example, the edge determination unit 130 may use the difference between the signal intensities of the central pixel and each adjacent pixel calculated by the weight determination unit 120 to obtain a weight.

Once the differences between the signal intensities of the central pixel and the adjacent pixels are calculated, the edge determination unit 130 may calculate a sum of the differences between the signal intensities of the central pixel and the adjacent pixels for each direction in which the adjacent pixels exist, in operation S520. The sum of the differences between the signal intensities of the central pixel and the adjacent pixels for each direction in which the adjacent pixels exist may be obtained by the below Equation 3, for example.

$$D_{HOR}=D_{HOR\_1}+D_{HOR\_2}$$

$$D_{VER}=D_{VER\_1}+D_{VER\_2}$$

$$D_{NE}=D_{NE\_1}+D_{NE\_2}$$

$$D_{NW}=D_{NW\_1}+D_{NW\_2}$$ Equation 3

Here, $D_{HOR}$, $D_{VER}$, $D_{NE}$ and $D_{NW}$ indicate sums of signal intensity differences in the horizontal, vertical, upper right-to-lower-left, and upper left-to-lower right directions in the window, respectively.

The edge determination unit 130 may further select a minimum sum from the sums $D_{HOR}$, $D_{VER}$, $D_{NE}$ and $D_{NW}$ of signal intensity differences, in operation S530, and determine whether at least one of two signal intensity differences in a direction orthogonal to a direction having the selected minimum sum of signal intensity differences is greater than a predetermined threshold value, in operation S540. For example, if the minimum sum is the sum $D_{HOR}$ of signal intensity differences in the horizontal direction, the edge determination unit 130 may compare signal intensity differences $D_{VER\_1}$ and $D_{VER\_2}$ in the vertical direction, which is orthogonal to the horizontal direction, with the predetermined threshold value. If the minimum sum is the sum $D_{NE}$ of signal intensity differences in the upper right-to-lower left direction, the edge determination unit 130 compares signal intensity differences $D_{NW\_1}$ and $D_{NW\_2}$ in the upper left-to-lower right direction, which is orthogonal to the upper right-lower left direction, with the predetermined threshold value.

Figure 7:
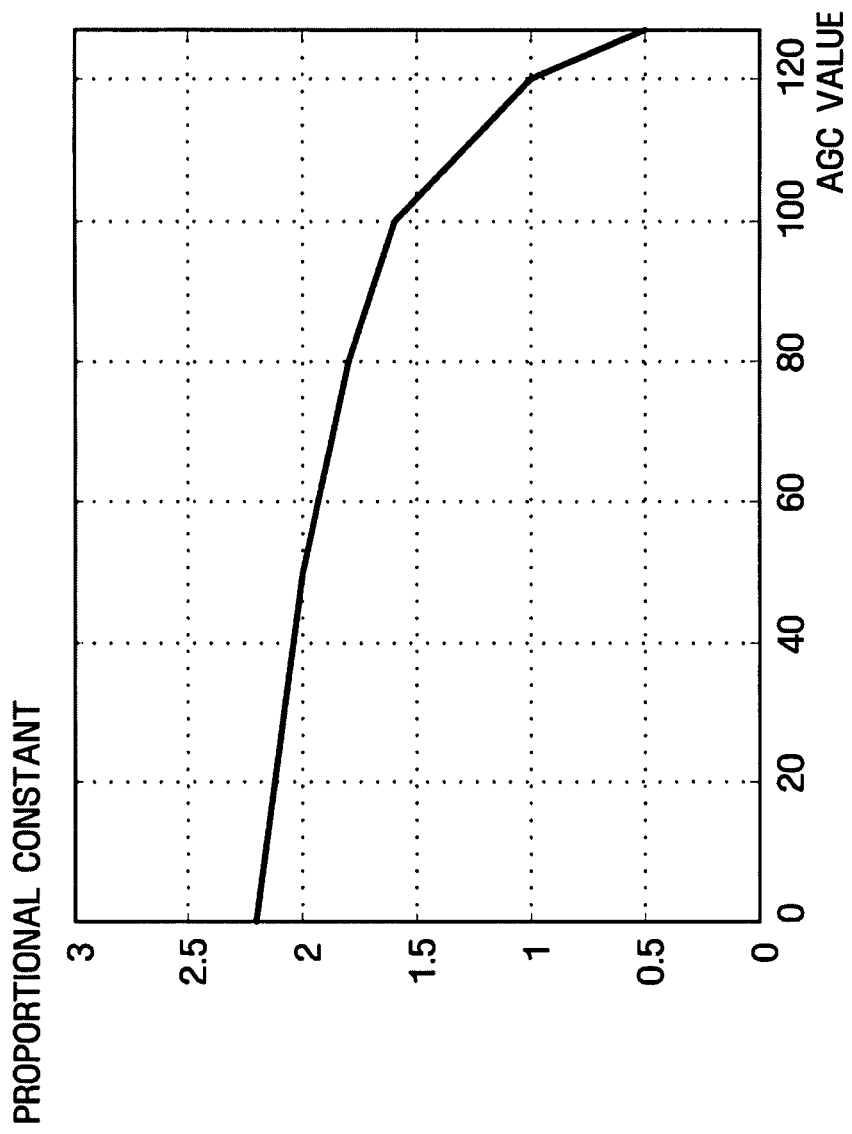
FIG. 7 illustrates a relationship between an AGC value and a proportional constant, according to an embodiment of the present invention.

The predetermined threshold value may be a value obtained after the noise level of the input image, according to the signal intensity thereof, is multiplied by a predetermined proportional constant, for example. In an embodiment, the proportional constant may be dynamically determined according to the AGC value of the input image. The relationship between the AGC value and the proportional constant may be experimentally set according to the characteristics of a photographing system implementing the noise reduction. An example of this relationship is illustrated in FIG. 7.

Referring back to FIG. 5, when it is determined, e.g., in operation S540, that at least one of the two signal intensity differences in the direction orthogonal to the direction having the selected minimum sum of signal intensity differences is greater than the predetermined threshold value, the edge determination unit 130 may determine the direction having the minimum sum of signal intensity differences, e.g., as selected in operation S530, to be an edge direction of the central pixel, in operation S550. However, when it is determined that at least one of the two signal intensity differences is not greater than the predetermined threshold value, the edge determination unit 130 may determine the central pixel to be a non-edge pixel, in operation S560.

Referring back to FIG. 1, the weight compensation unit 140 may compensate for the weight, which is determined by the weight determination unit 120, according to the edge direction of the central pixel determined by the edge determination unit 130, for example. In this case, the weight compensation unit 140 can compensate for the weight of each adjacent pixel in a differential manner so that adjacent pixels existing in the edge direction of the central pixel from the central pixel in the window can have a greater effect on the determination of the signal intensity of the central pixel than other adjacent pixels.

Figure 8:
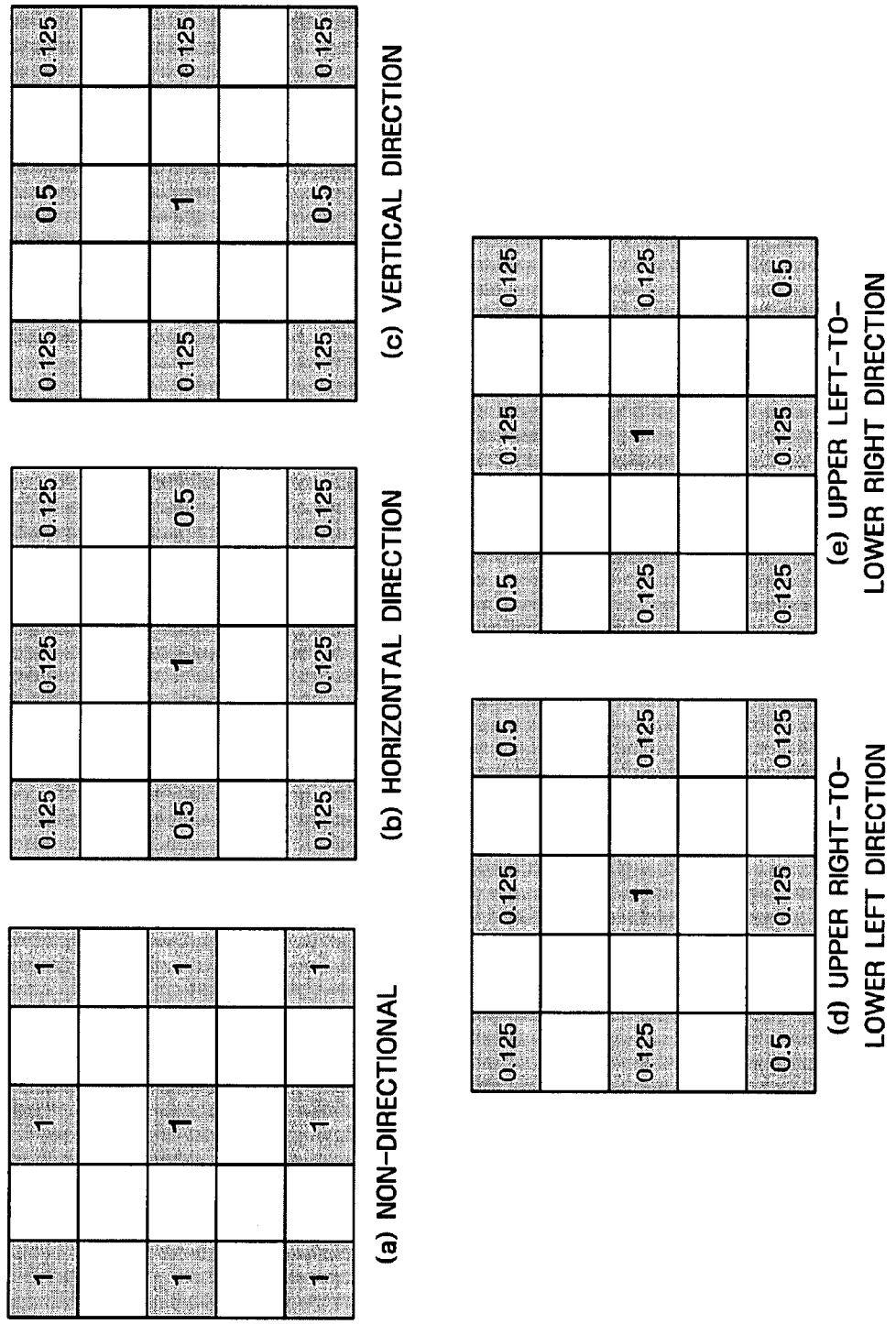
FIG. 8 illustrates a mask according to an embodiment of the present invention.

For example, the weight compensation unit 140 may assign mask values, as illustrated in illustrations (a)-(e) of FIG. 8, according to the edge type of the central pixel in the window. Referring to FIG. 8, if the central pixel is the edge pixel, a mask value of 1 may be assigned to the central pixel, a mask value of 0.5 may be assigned to adjacent pixels in the edge direction of the central pixel, and a mask value of 0.125 assigned to the remaining adjacent pixels, for example. If the central pixel is a non-edge pixel, 1 may, thus, be assigned to the central pixel and all the adjacent pixels as a mask value. Accordingly, in an embodiment, the weight compensation unit 140 may provide weights compensated for after performing an operation using the mask values and the weights provided by the weight determination unit 120. According to a further embodiment, the operation using the mask values and the weights may be a bit shift operation, for example. In such a case, a 1-bit shift operation may be performed on a weight for a mask value of 0.5, and a 3-bit shift operation may be performed on the weight for a mask value of 0.125.

As noted above, referring to FIG. 1, the impulse noise determination unit 150 may further determine whether impulse noise is contained in the input image. Here, the impulse noise determination unit 150 may use various conventional impulse noise determination technologies. However, for merely illustrative purposes, and as an example embodiment of the present invention, the case where the impulse noise determination unit 150 uses rank-ordered absolute differences (ROAD) will be now described with reference to FIG. 9.

In such an embodiment, to determine whether the impulse noise is contained in the input image, the impulse noise determination unit 150 calculates ROAD statistics for the window, in operation S910. ROAD was discussed by Roman Garntt, Tomothy Huegerich, Charles Chui, and Wenjie He in "A Universal Noise Removal Algorithm with an Impulse Detector, IEEE Transactions on Image Processing, Vol. 14, No. 11, November 2005, and will hereinafter be further briefly described.

If an input image is distorted by impulse noise, some of pixels of the input image will have signal intensities irrelevant to the input image. Therefore, the signal intensities of the pixels having the impulse noise will be greatly different from those of adjacent pixels. The pixels having the impulse noise can be detected using this difference.

Below, ff $\Omega_N$ is a set of coordinates of pixels in a (2N+1)×(2N+1) window, and the set of coordinates may be defined by the below Equation 4, for example.

$$\Omega_N = \{(s,t) | -N \leq s, t \leq N\} \quad \text{Equation 4}$$

Figure 10:
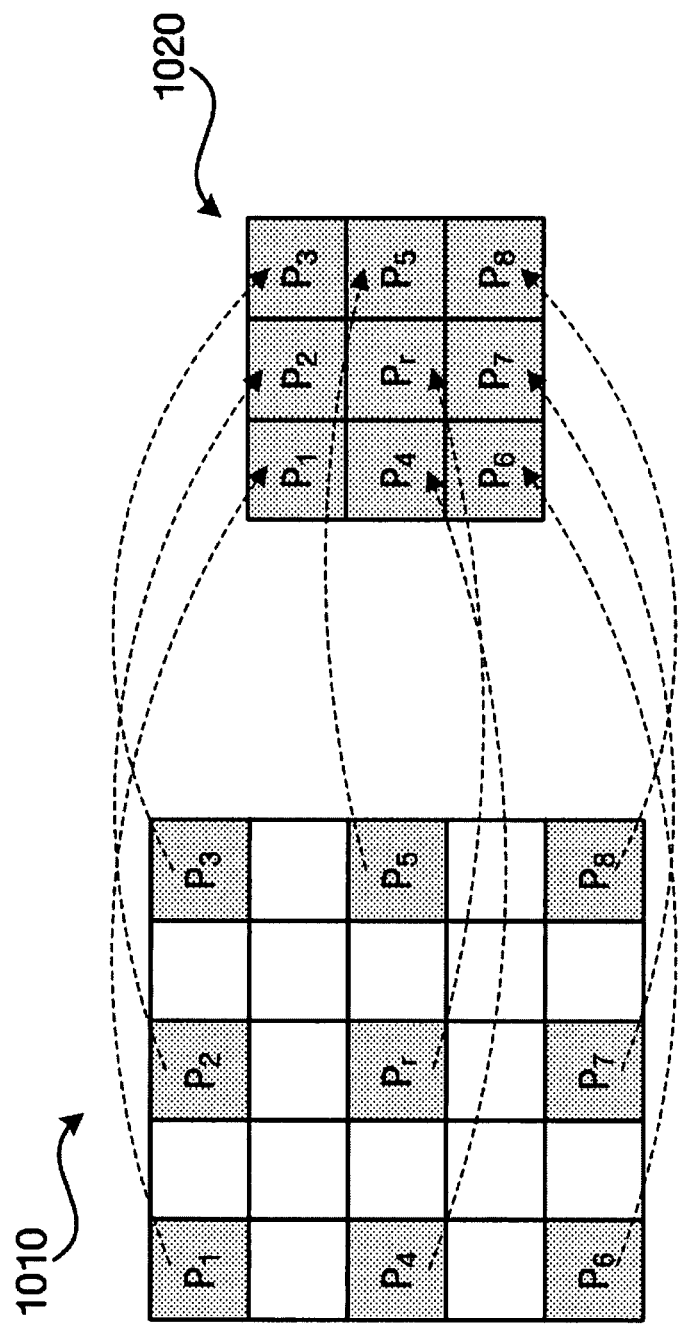
FIG. 10 is an illustration for explaining a method of calculating a rank-ordered absolute differences (ROAD)

Here, s and t indicate coordinate values of pixels in a window when coordinates of a central pixel are (0, 0). If the input image is processed to have the RGB Bayer pattern, it can be assumed that there exists a virtual window 1020 made up of a central pixel and its adjacent pixels in a real window 1010, as illustrated in FIG. 10. In this case, $\Omega_N$ may be understood to be coordinates of pixels within the virtual window 1020.

Assuming that the signal intensity of the central pixel in the window is $I_{0,0}$, the signal intensity of each adjacent pixels is $I_{s,t}$, and $\Omega_N^0$ is a set of coordinates excluding the coordinates (0, 0) of the central pixel from $\Omega_N$, an absolute value $d_{s,t}$ of the difference between the signal intensities of the central pixel and each adjacent pixel may be further be found by the below Equation 5, for example.

$$d_{s,t} = |I_{s,t} - I_{0,0}|, (s,t) \in \Omega_N^0 \quad \text{Equation 5}$$

The absolute values $d_{s,t}$ calculated using Equation 5 may be sorted in an ascending order. If $r_k$ indicates a $k^{th}$ smallest value among the absolute values $d_{s,t}$, the ROAD may be defined by the below Equation 6, for example.

$$ROAD_m = \sum_{k=1}^{m} r_k \quad \text{Equation 6}$$

Here, m has a range of $2 \leq m \leq (2N+1)^2 - 2$. If m is set to 4, the ROAD provides information regarding closeness of signal intensity between the central pixel and its four adjacent pixels having signal intensities closest to that of the central pixel. If the central pixel is included in an area of a uniform color in the input image, the central pixel and its adjacent pixels may have similar signal intensities. Thus, the ROAD may be low. Even if the central pixel exists on an edge, at least half the adjacent pixels would have signal intensities similar to that of the central pixel. Hence, there is a high probability that the ROAD of the central pixel will be low. However, if impulse noise is contained in the central pixel, the differences between the central pixel and its adjacent pixels would be very large. Thus, the ROAD would be very high.

Referring back to FIG. 9, after calculating the ROAD, the impulse noise determination unit 150 may compare the calculated ROAD with a first threshold value, in operation S915. If the calculated ROAD is greater than the first threshold value, the impulse noise determination unit 150 may determine that impulse noise is contained in the central pixel, in operation S920.

However, if the calculated ROAD is not greater than the first threshold value, the impulse noise determination unit 150 may compare the calculated ROAD with a second threshold value, in operation S925. If the calculated ROAD is less than the second threshold value, the impulse noise determination unit 150 may determine that impulse noise is not contained in the central pixel, in operation S930.

The first threshold value is greater than the second threshold value, and the first and second threshold values may be dynamically determined according to the AGC value of the input image. The first and second threshold values according to the AGC value of the input image may be set experimentally in consideration of the characteristics of a photographing system to which the noise reduction system 100 will be applied.

If the ROAD is less than the first threshold value but greater than the second threshold value, the impulse noise determination unit 150 may calculate a variance of the signal intensities of the central pixel and the adjacent pixels, in operation S935, and compare the calculated variance with a third threshold value, in operation S940. If the calculated variance is greater than the third threshold value, the impulse noise determination unit 150 may determine that impulse noise does not exist in the central pixel, in operation S945. If a variance exceeds a predetermined threshold value, it denotes that the differences between signal intensities of a central pixel and its adjacent pixels in a window are great, such that it can be determined that image information is included in the central pixel.

However, if the variance is not greater than the third threshold value, the impulse noise determination unit 150 may determine whether all of the differences between the signal intensities of the central pixel and the adjacent pixels are greater than a fourth threshold value, in operation S950. If all of the differences between the signal intensities of the central pixel and the adjacent pixels are greater than the fourth threshold value, the impulse noise determination unit 150 may determine that impulse noise is contained in the central pixel, in operation S955. If there are relatively large differences between the signal intensities of the central pixel and the adjacent pixels, it can be determined that the central pixel has many abnormal values.

However, if any of the differences between the signal intensities of the central pixel and the adjacent pixels is not greater than the fourth threshold value, the impulse noise determination unit 150 may determine that impulse noise is not contained in the central pixel, in operation S960. This is because, although there are relatively large differences between the signal intensities of the central pixel and the adjacent pixels, if the differences between the signal intensities of the central pixel and some of the adjacent pixels are not large, it can be determined that the central pixel exists on the edge of the input image.

Figure 9:
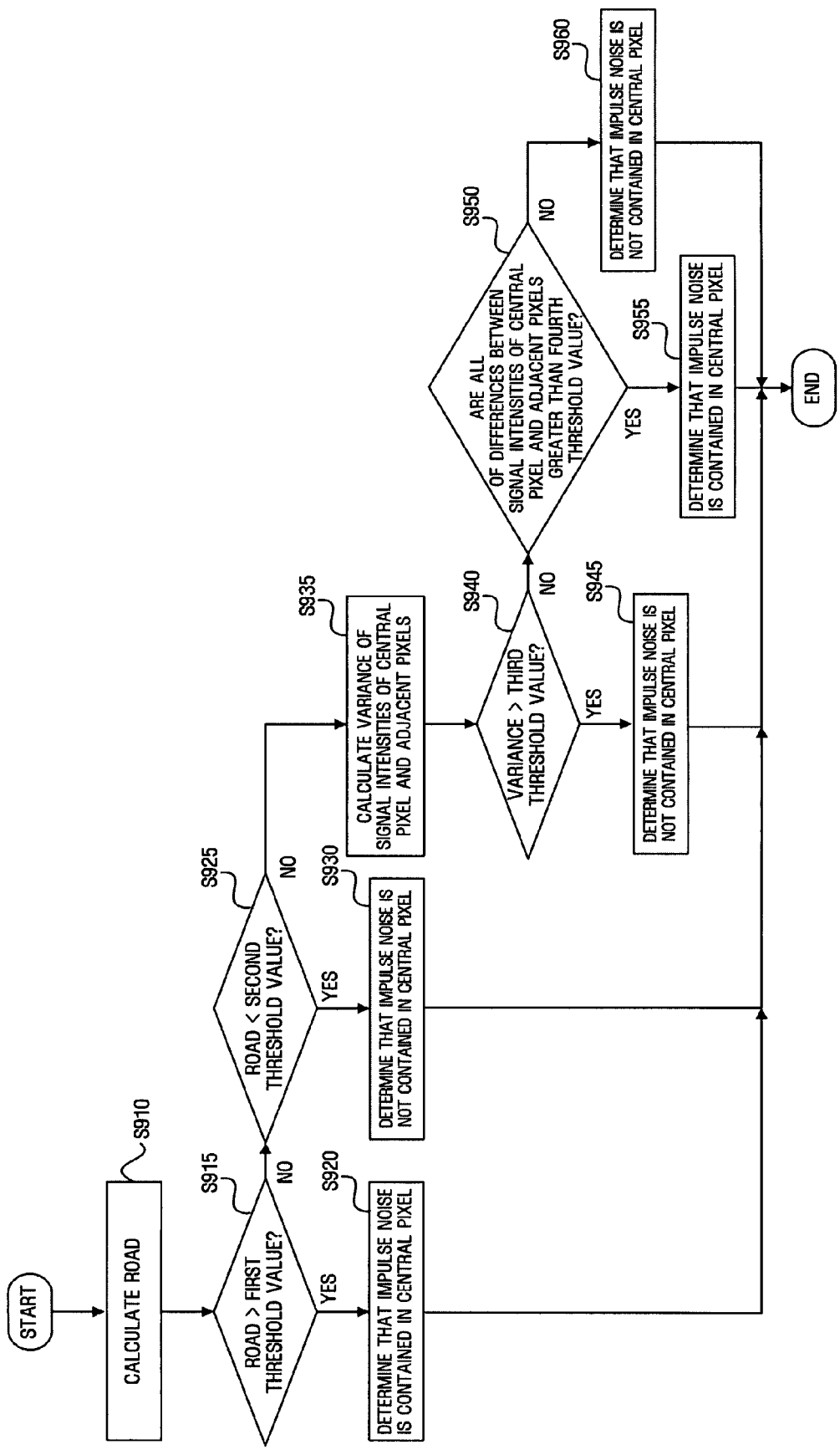
FIG. 9 illustrates a method of determining impulse noise, according to an embodiment of the present invention.

All operations illustrated in the flowchart of FIG. 9 may be performed regardless of the illuminance of the input image. However, embodiments of the present invention are not restricted thereto. Impulse noise is highly likely to occur in an input image with low illuminance. Therefore, according to an embodiment of the present invention, if the illuminance of the input image is less than a predetermined threshold value, the impulse noise may be detected in a more precise manner through operation S950 and its subsequent operations. If the illuminance of the input image is not less than the predetermined threshold value, operation S950 and its subsequent operations may be omitted, for example, thereby reducing the amount of computation. In this case, if it is determined in operation S940 that the calculated variance is not greater than the third threshold value, the impulse noise determination unit 150 may determine that impulse noise is not contained in the central pixel.

Referring to FIG. 1, the filtering unit 160 may filter the input image using the weights compensated for by the weight compensation unit 140. After the filtering operation, a mean of weighted sums of the central pixel and each the adjacent pixels may be set as the signal intensity of the central pixel. More specifically, the filtering unit 160 may determine the signal intensity of the central pixel using a fuzzy spatial filter. Such a fuzzy spatial filter is defined by the below Equation 7, for example, and was discussed in detail by Tinku Acharya and Ajoy K. Ray in "Image Processing," Wiley-Interscience, 2005.

$$s_x = \frac{1}{N-1} \sum_{m=1}^{N-1} [k'(I_m - I_x)I_m + (1 - k'(I_m - I_x))I_x] \quad \text{Equation 7}$$

Here, $S_x$ indicates a final signal intensity of a central pixel after the filtering operation and N indicates the number of adjacent pixels. In addition, $I_m$ and $I_x$ indicate the signal intensities of each adjacent pixel and the central pixel, respectively, and $k'(I_m - I_x)$ indicates the result of compensating for the weight, which was described above with reference to Equation 1, using the weight compensation unit 140, for example.

If the impulse noise determination unit 150 determines that impulse noise is contained in the central pixel, the filtering unit 160 may further determine the mean of the signal intensities of the adjacent pixels to be a final signal intensity of the central pixel. In an embodiment, if Equation 7 is used to calculate the final signal intensity of the central pixel, the compensated weight $k'(I_m - I_x)$ has a value of 1 when impulse noise is contained in the central pixel. In this case, the signal intensity $I_x$ of the central pixel having impulse noise is filtered and thus does not affect the final signal intensity of the central pixel.

The operation of the noise reduction system 100 will now be described with reference to FIG. 11.

Figure 11:
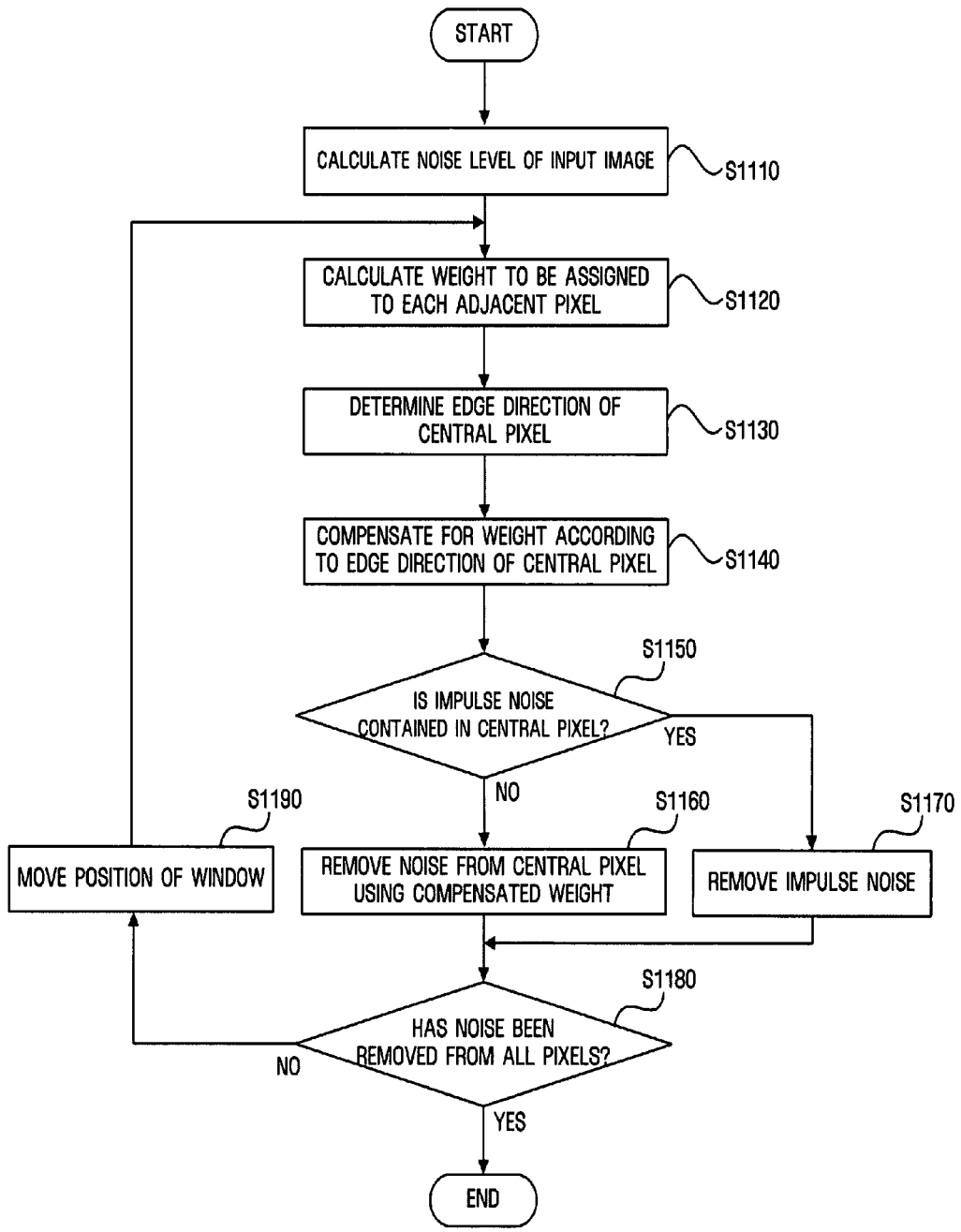
FIG. 11 illustrates a noise reduction method, according to an embodiment of the present invention.

FIG. 11 illustrates a noise reduction method, according to an embodiment of the present invention. Referring to FIG. 11, a noise level of an input image may be calculated, e.g., by the noise level calculation unit 110, in operation S1110. The noise level may include at least one of a first noise level according to the AGC value of the input image when photographed and a second noise level according to the signal intensity of the input image, for example.

A weight may be calculated for assignment to each pixel adjacent to a central pixel, which is a target pixel for noise reduction, in a window of a predetermined size, e.g., by the weight determination unit 120, in operation S1120. In addition, an edge direction of the central pixel in the window may be determined, e.g., by the edge determination unit 130, in operation S1130.

Further, the weights provided, e.g., by the weight determination unit 120, may be compensated for, e.g., by the weight compensation unit 140, in operation S1140, and whether the central pixel is determined to be impulse noise, e.g., by the impulse noise determination unit 150, in operation S1150.

If the central pixel is determined to not contain impulse noise, the noise from the central pixel may be removed by using the compensated weights, e.g., by the filtering unit 160, in operation S1160. Here, in an embodiment, the final signal intensity of the central pixel may be the mean of the weighted sums between the original signal intensity of the central pixel and each the signal intensities of the adjacent pixels.

However, if it is determined that the central pixel does include impulse noise, the impulse noise from the central pixel may be removed regardless of the compensated weight, e.g., by the filtering unit 160, in operation S1170. In this case, the final signal intensity of the central pixel may be the mean of the signal intensities of the adjacent pixels.

Once noise is removed from all pixels, for example, in the input image, in operation S1180, the noise reduction process may be terminated. However, if there is any pixel from which noise has not been removed, the position of the window in the input image may be moved, in operation S1190, and operation of the method may return to operation S1120.

The operations illustrated in FIG. 11 may be performed for each optical channel of the input image. For example, if the input image is in the RGB domain, the operations illustrated in FIG. 11 may be performed for each of the R, G and B channels. Similarly, in another embodiment, if the input image is in the YCrCb domain, the operations illustrated in FIG. 11 may be performed for each of Y, Cr, and Cb channels.

Figure 12:
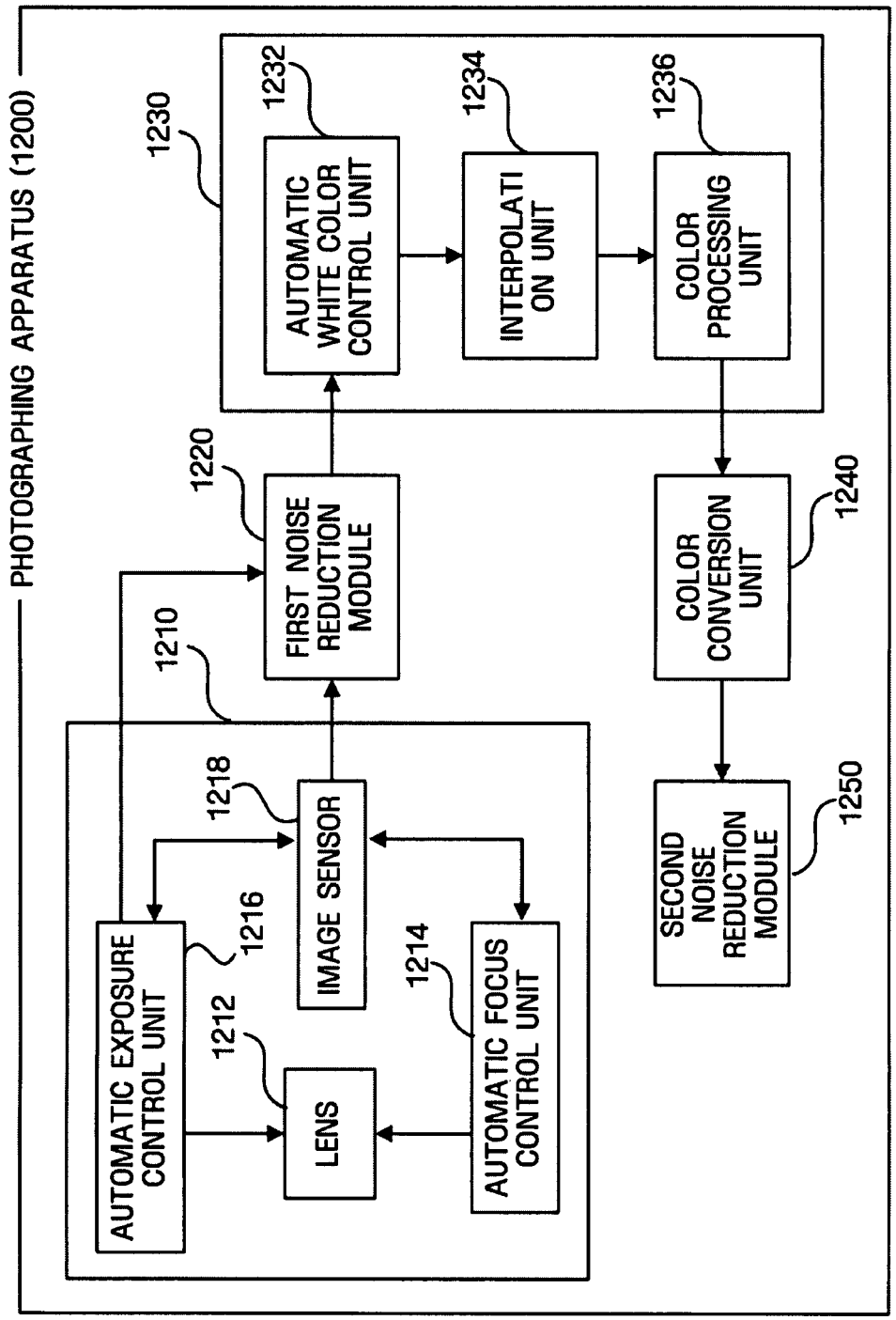
FIG. 12 illustrates a photographing system including noise reduction, such as that of system of FIG. 1, according to an embodiment of the present invention.

FIG. 12 illustrates a photographing system 1200 implementing noise reduction, according to an embodiment of the present invention. Referring to FIG. 12, the photographing system 1200 may include a photographing unit 1210, a first noise reduction module 1220, an image correction unit 1230, a color conversion unit 1240, and a second noise reduction module 1250, for example. The noise reduction system 100 described above can be implemented as the first noise reduction module 1220 and the second noise reduction module 1250 in the photographing system 1200.

The photographing unit 1210 may capture an image and/or provide an input image. In this embodiment, the photographing unit 1210 may include a lens 1212, an automatic focus control unit 1210 controlling the focus of the lens 1212, an automatic exposure control unit 1216 controlling the amount of light received by the lens 1212, and an image sensor 1218 imaging light collected by the lens 1212, for example. The image sensor 1218 may provide an input image having the RGB Bayer pattern, for example.

The first noise reduction module 1220 may reduce noise in the input image for each of the R, G and B channels. Operations of the first noise reduction module 1220 may be understood to be similar to the above descriptions of the noise reduction system 100, and consistent with the above FIGS. 1 through 11, for example. Depending on embodiment, information regarding the signal intensity, AGC value, and illuminance of the input image that may be used in such noise reduction may be obtained from the automatic exposure control unit 1216.

The image correction unit 1230 may correct distortion information within the input image, distinguished from an original image without such distortions, from which noise has been removed by the first noise reduction unit 1220. The image correction unit 1230 may include an automatic white color control unit 1232 controlling a color temperature of the input image to become close to that of the original image, an interpolator 1234 interpolating RGB values between pixels of the input image and distributing the RGB values to each pixel having the Bayer pattern, and a color processing unit 1236 performing a color calibration operation, for example.

The color conversion unit 1240 may further be used to convert the color domain of the input image corrected by the image correction unit 1230 from the RGB domain to the YCrCb or YUV domain, for example.

Even if noise has been removed from the input image by the first noise reduction module 1220, the noise characteristics of the input image may change according to various processing operations of the image correction unit 1230 and the color domain conversion operation of the color conversion unit 1240. Alternatively, a particular noise component of the input image may increase due to the noise correlation between pixels of the input image. Therefore, it is desirable to remove noise from the input image again, which is performed by the second noise reduction module 1250. The operations of the second noise reduction module 1250 can also be similar to the noise reduction system 100 described above and consistent with FIGS. 1 through 11. While the first noise reduction module 1220 may perform noise elimination for the R, G, and B channels, the second noise reduction module 1250 may perform the noise elimination operation for the Y, Cr and Cb channels or the Y, U and V channels, for example. Furthermore, since impulse noise in the input image has already been removed by the first noise reduction module 1220, the operation of an impulse noise determination unit, such as that of the impulse noise determination unit 150 included in the noise reduction system 100 of FIG. 1, may not be necessary in the second noise reduction module 1250.

The input image, from which noise has been removed again by the second noise reduction module 1250, may be stored in a predetermined storage medium or displayed on a display panel, for example.

Accordingly, a noise reduction method, medium, and system, according to one or more embodiments of the present invention, can remove noise from an input image and thus improve the quality of an output image.

The 'unit', as used herein to indicate each component of the noise reduction system 100 and the photographing system 1200, may be implemented as a module. The term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules.

Additionally, in addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A noise reduction method, comprising:
    calculating a noise level of an input image;
    decomposing the input image into pixels of different color channels;
    determining an edge type of an edge of a central pixel;
    controlling a removing of noise from the central pixel, within a window in the input image of a predetermined size including respective pixels of the different color channels, using a weight determined with respect to the edge type of the central pixel, based on a difference between signal intensities of the central pixel of a respective color channel and a plurality of adjacent pixels of the respective color channel within the window and the calculated noise level excluding pixels within the window of a color channel different from the respective color channel; and determining whether impulse noise is contained in the central pixel, using plural threshold values, wherein when the impulse noise is determined to be contained in the central pixel, outputting a mean of weighted sums comprising outputting a mean of signal intensities of the plurality of adjacent pixels as a final signal intensity of the central pixel, wherein the outputting of the mean of the weighted sums comprises determining whether the impulse noise is contained in the central pixel using a rank-ordered absolute differences statistic (ROAD) calculated for the window.

2. The noise reduction method of claim 1, wherein the calculated noise level comprises at least one of a first noise level based on an auto gain control (AGC) value of the input image when photographed and a second noise level based on a signal intensity of the input image.

3. The noise reduction method of claim 1, wherein the removal of the noise from the central pixel comprises:

calculating weights to be assigned to the plurality of adjacent pixels based on differences between the signal intensities and the calculated noise level;

compensating for the calculated weights according to an edge direction of the central pixel; and outputting a mean of weighted sums of the signal intensities of the central pixel and the plurality of adjacent pixels as a final signal intensity of the central pixel, wherein the mean of the weighted sums is calculated using the calculated weights.

4. The noise reduction method of claim 3, wherein the calculation of the weights comprises calculating the weights using a fuzzy membership function whose resultant values have a Gaussian distribution according to the differences between the signal intensities of the central pixel and the plurality of adjacent pixels.

5. The noise reduction method of claim 3, wherein the compensation of the calculated weights comprises:

assigning predetermined mask values to the plurality of adjacent pixels according to the edge direction of the central pixel; and providing the compensated weights based on respective calculated weights of the plurality of adjacent pixels and the mask values.

6. The noise reduction method of claim 5, wherein higher mask values are assigned to at least one of the plurality of adjacent pixels existing in the edge direction of the central pixel from the central pixel than mask values assigned to remaining adjacent pixels of the plurality of adjacent pixels.

7. The noise reduction method of claim 5, wherein the providing of the compensated weights implements a bit shift operation.

8. The noise reduction method of claim 3, wherein the mean of the weighted sums is calculated using a fuzzy spatial filter.

9. The noise reduction method of claim 3, wherein the outputting of the mean of the weighted sums comprises outputting a mean of signal intensities of the plurality of adjacent pixels as the final signal intensity of the central pixel when impulse noise is determined to be contained in the central pixel.

10. The noise reduction method of claim 9, wherein the outputting of the mean of the weighted sums comprises determining whether the impulse noise is contained in the central pixel using a rank-ordered absolute differences statistic (ROAD) calculated for the window.

11. The noise reduction method of claim 10, wherein the determination of whether the impulse noise is contained in the central pixel comprises determining that the impulse noise is contained in the central pixel when the ROAD is greater than a first threshold value.

12. A noise reduction method, comprising:

calculating a noise level of an input image; and controlling a removing of noise from a central pixel within a window of a predetermined size in the input image using a weight determined based on a difference between signal intensities of the central pixel and a plurality of adjacent pixels within the window and the calculated noise level, wherein the removal of the noise from the central pixel comprises:

calculating weights to be assigned to the plurality of adjacent pixels based on differences between the signal intensities and the calculated noise level;

compensating for the calculated weights according to an edge direction of the central pixel; and outputting a mean of weighted sums between the signal intensities of the central pixel and the plurality of adjacent pixels as a final signal intensity of the central pixel, wherein the outputting of the mean of the weighted sums comprises outputting a mean of signal intensities of the plurality of adjacent pixels as the final signal intensity of the central pixel when impulse noise is determined to be contained in the central pixel, wherein the outputting of the mean of the weighted sums comprises determining whether the impulse noise is contained in the central pixel using a rank-ordered absolute differences statistic (ROAD) calculated for the window, wherein the mean of the weighted sums is calculated using the calculated weights, and wherein the determination of whether the impulse noise is contained in the central pixel comprises determining that the impulse noise is not contained in the central pixel when the ROAD is less than a first threshold value but greater than a second threshold value and a variance of the signal intensities of the central pixel and the plurality of adjacent pixels is greater than a third threshold value.

13. A noise reduction method, comprising:

calculating a noise level of an input image; and controlling a removing of noise from a central pixel within a window of a predetermined size in the input image using a weight determined based on a difference between signal intensities of the central pixel and a plurality of adjacent pixels within the window and the calculated noise level, wherein the removal of the noise from the central pixel comprises:

calculating weights to be assigned to the plurality of adjacent pixels based on differences between the signal intensities and the calculated noise level;

compensating for the calculated weights according to an edge direction of the central pixel; and outputting a mean of weighted sums between the signal intensities of the central pixel and the plurality of adjacent pixels as a final signal intensity of the central pixel, wherein the outputting of the mean of the weighted sums comprises outputting a mean of signal intensities of the plurality of adjacent pixels as the final signal intensity of the central pixel when impulse noise is determined to be contained in the central pixel, wherein the outputting of the mean of the weighted sums comprises determining whether the impulse noise is contained in the central pixel using a rank-ordered absolute differences statistic (ROAD) calculated for the window, wherein the mean of the weighted sums is calculated using the calculated weights, and wherein the determination of whether the impulse noise is contained in the central pixel comprises determining that the impulse noise is contained in the central pixel if all differences between the signal intensities of the central pixel and the plurality of adjacent pixels are greater than a fourth threshold value when the ROAD is less than a first threshold value but greater than the second threshold value and the variance of the signal intensities of the central pixel and the plurality of adjacent pixels is less than the third threshold value.

14. The noise reduction method of claim 13, wherein the determination that the impulse noise is contained in the central pixel is made when an illuminance value of the input image is less than a predetermined threshold value.

15. The noise reduction method of claim 1, wherein the noise level is separately calculated for each of the plural color channels of the input image by movement of the window within the input image, and the removal of the noise from the central pixel comprises removing noise from respective central pixels for each of the plural color channels of the input image.

16. The noise reduction method of claim 1, wherein the noise reduction method is implemented by a photographing system.

17. At least one non-transitory computer readable omedium comprising computer readable code to control at least one processing element to implement the method of claim 1.

18. A system with noise reduction, comprising:
a noise level calculation unit to calculate a noise level of an input image;
an edge determination unit to determine an edge type of an edge of a central pixel;
a filtering unit to decompose the input image into pixels of different color channels, control a removing of noise from the central pixel, within a window in the input image of a predetermined size including respective pixels of the different color channels, using a weight determined, with respect to the edge type of the central pixel, based on a difference between signal intensities of the central pixel of a respective color channel and plurality of adjacent pixels of the respective color channel within the window and the calculated noise level excluding pixels within the window of a color channel different from the respective color channel; and
an impulse noise determination unit to determine whether impulse noise is contained in the central pixel, using plural threshold values,
wherein when the impulse noise is determined to be contained in the central pixel, outputting a mean of weighted sums comprising outputting a mean of signal intensities of the plurality of adjacent pixels as a final signal intensity of the central pixel,
wherein the outputting of the mean of the weighted sums comprises determining whether the impulse noise is contained in the central pixel using a rank-ordered absolute differences statistic (ROAD) calculated for the window.

19. The system of claim 18, wherein the calculated noise level comprises at least one of a first noise level based on an AGC value of the input image when photographed and a second noise level based on a signal intensity of the input image.

20. The system of claim 18, further comprising:
a weight calculation unit to calculate weights to be assigned to the plurality of adjacent pixels based on differences between the signal intensities and the calculated noise level; and
a weight compensation unit to compensate for the calculated weights according to an edge direction of the central pixel,
wherein the filtering unit calculates and outputs a mean of weighted sums of the signal intensities of the central pixel and the plurality of adjacent pixels using the calculated weights, with the output mean being a final signal intensity of the central pixel.

21. The system of claim 20, wherein the weight calculation unit calculates the weights using a fuzzy membership function whose resultant values have a Gaussian distribution according to the differences between the signal intensities of the central pixel and the plurality of adjacent pixels.

22. The system of claim 20, wherein the weight compensation unit assigns predetermined mask values to the plurality of adjacent pixels according to the edge direction of the central pixel and provides the compensated weights based on the respective calculated weights of the plurality of adjacent pixels and the mask values.

23. The system of claim 22, wherein higher mask values are assigned to at least one of the plurality of adjacent pixels existing in the edge direction of the central pixel from the central pixel than mask values assigned to remaining adjacent pixels of the plurality of adjacent pixels.

24. The system of claim 22, wherein the providing of the compensated weights is implemented through a bit shift operation.

25. The system of claim 20, wherein the filtering unit calculates the mean of the weighed sums using a fuzzy spatial filter.

26. The system of claim 20, wherein the filtering unit outputs a mean of signal intensities of the plurality of adjacent pixels as the final signal intensity of the central pixel when impulse noise is determined to be contained in the central pixel.

27. The system of claim 26, further comprising an impulse noise determination unit which determines whether the impulse noise is contained in the central pixel using a ROAD calculated for the window.

28. The system of claim 27, wherein the impulse noise determination unit determines that the impulse noise is contained in the central pixel when the ROAD is greater than a first threshold value.

29. A system with noise reduction, comprising:
a noise level calculation unit to calculate a noise level of an input image;
a filtering unit to control a removing of noise from a central pixel within a window of a predetermined size in the input image using a weight determined based on a difference between signal intensities of the central pixel and plurality of adjacent pixels within the window and the calculated noise level;
a weight calculation unit to calculate weights to be assigned to the plurality of adjacent pixels based on differences between the signal intensities and the calculated noise level;

a weight compensation unit to compensate for the calculated weights according to an edge direction of the central pixel; and an impulse noise determination unit which determines whether impulse noise is contained in the central pixel using a ROAD calculated for the window, wherein the filtering unit calculates and outputs a mean of weighted sums of the signal intensities of the central pixel and the plurality of adjacent pixels using the calculated weights as a final signal intensity of the central pixel when the impulse noise is determined to not be contained in the central pixel, and outputs a mean of signal intensities of the plurality of adjacent pixels as the final signal intensity of the central pixel when the impulse noise is determined to be contained in the central pixel, wherein the impulse noise determination unit determines that the impulse noise is not contained in the central pixel when the ROAD is less than the first threshold value but greater than a second threshold value and a variance of the signal intensities of the central pixel and the plurality of adjacent pixels is greater than a third threshold value.

30. A system with noise reduction, comprising:

a noise level calculation unit to calculate a noise level of an input image;

a filtering unit to control a removing of noise from a central pixel within a window of a predetermined size in the input image using a weight determined based on a difference between signal intensities of the central pixel and plurality of adjacent pixels within the window and the calculated noise level;

a weight calculation unit to calculate weights to be assigned to the plurality of adjacent pixels based on differences between the signal intensities and the calculated noise level;

a weight compensation unit to compensate for the calculated weights according to an edge direction of the central pixel; and an impulse noise determination unit which determines whether impulse noise is contained in the central pixel using a ROAD calculated for the window, wherein the filtering unit calculates and outputs a mean of weighted sums of the signal intensities of the central pixel and the plurality of adjacent pixels using the calculated weights, with the output mean being a final signal intensity of the central pixel, wherein the filtering unit outputs a mean of signal intensities of the plurality of adjacent pixels as the final signal intensity of the central pixel when the impulse noise is determined to be contained in the central pixel, wherein the impulse noise determination unit determines that the impulse noise is contained in the central pixel if all differences between the signal intensities of the central pixel and the plurality of adjacent pixels are greater than a fourth threshold value when the ROAD is less than the first threshold value but greater than the second threshold value and the variance of the signal intensities of the central pixel and the plurality of adjacent pixels is less than the third threshold value.

31. The system of claim 30, wherein the impulse noise determination unit determines that the impulse noise is contained in the central pixel when an illuminance value of the input image is less than a predetermined threshold value.

32. The system of claim 18, wherein the noise level is separately calculated for each of the plural color channels of the input image by movement of the window within the input image, and the filtering unit removes the noise from respective central pixels for each of the plural color channels of the input image.

33. A photographing system, comprising:

a photographing unit to photograph a subject as an input image;

an edge determination unit to determine an edge type of an edge of a central pixel;

a noise reduction unit to decompose the input image into pixels of different color channels, calculate a noise level of the input image and control a removal of noise from the central pixel, within a window in the input image of a predetermined size including respective pixels of the different color channels, using a weight determined with respect to the edge type of the central pixel, based on a difference between signal intensities of the central pixel of a respective color channel and a plurality of adjacent pixels of the respective color channel within the window and the calculated noise level excluding pixels within the window of a color channel different from the respective color channel; and an impulse noise determination unit to determine whether impulse noise is contained in the central pixel, using plural threshold values, wherein when the impulse noise is determined to be contained in the central pixel, outputting a mean of weighted sums comprising outputting a mean of signal intensities of the plurality of adjacent pixels as a final signal intensity of the central pixel, wherein the outputting of the mean of the weighted sums comprises determining whether the impulse noise is contained in the central pixel using a rank-ordered absolute differences statistic (ROAD) calculated for the window.

* * * * *